(12) United States Patent
Pesyna

(10) Patent No.: US 10,378,477 B2
(45) Date of Patent: Aug. 13, 2019

(54) NOZZLE FOR JET ENGINES

(71) Applicant: Rolls-Royce North American Technologies, Inc., Indianapolis, IN (US)

(72) Inventor: Kenneth M. Pesyna, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 733 days.

(21) Appl. No.: 15/054,982

(22) Filed: Feb. 26, 2016

(65) Prior Publication Data

US 2016/0326982 A1 Nov. 10, 2016

Related U.S. Application Data

(60) Provisional application No. 62/155,242, filed on Apr. 30, 2015.

(51) Int. Cl.
| | |
|---|---|
| *F02K 1/12* | (2006.01) |
| *F02K 3/075* | (2006.01) |
| *F02K 3/077* | (2006.01) |
| *F02C 3/04* | (2006.01) |
| *F02K 3/06* | (2006.01) |

(52) U.S. Cl.
CPC ............ *F02K 1/12* (2013.01); *F02C 3/04* (2013.01); *F02K 1/123* (2013.01); *F02K 3/06* (2013.01); *F02K 3/075* (2013.01); *F02K 3/077* (2013.01); *F05D 2220/32* (2013.01); *F05D 2240/128* (2013.01)

(58) Field of Classification Search
CPC ... F02K 1/12; F02K 1/123; F02K 3/06; F02K 3/075; F02K 3/077; F02C 3/04; F02C 6/20; F02C 7/12; F02C 9/00; F02C 9/26; F02C 9/48

See application file for complete search history.

(56) References Cited

U.S. PATENT DOCUMENTS

| | | |
|---|---|---|
| 3,687,399 A | 8/1972 | Tumavicus |
| 4,010,608 A * | 3/1977 | Simmons ................ F02K 3/075 60/226.3 |
| 5,141,154 A | 8/1992 | Barcza |
| 5,335,489 A | 8/1994 | Thayer |
| 5,351,888 A | 10/1994 | Taylor et al. |
| 5,435,127 A | 7/1995 | Luffy et al. |
| 5,694,768 A | 12/1997 | Johnson et al. |
| 5,867,980 A | 2/1999 | Bartos |
| 5,916,127 A | 6/1999 | Papamoschou |
| 6,983,602 B2 | 1/2006 | Senile |
| 7,032,835 B2 | 4/2006 | Murphy et al. |

(Continued)

FOREIGN PATENT DOCUMENTS

| | | |
|---|---|---|
| WO | 2014130361 A1 | 8/2014 |
| WO | 2014160449 A2 | 10/2014 |

OTHER PUBLICATIONS

Extended European Search Report, European Application No. 16166208.5-1607, dated Sep. 30, 2016, 10 pages.

*Primary Examiner* — Craig Kim

(74) *Attorney, Agent, or Firm* — Barnes & Thornburg LLP

(57) ABSTRACT

An exhaust system or nozzle for use in a gas turbine engine is disclosed herein. The exhaust system is adapted to adjust various streams of pressurized air produced by the gas turbine engine to control operation of the gas turbine.

14 Claims, 4 Drawing Sheets

(56) References Cited

U.S. PATENT DOCUMENTS

| | | |
|---|---|---|
| 7,140,174 B2 | 11/2006 | Johnson |
| 7,178,338 B2 | 2/2007 | Whurr |
| 7,225,622 B2 | 6/2007 | Petty et al. |
| 7,464,536 B2 | 12/2008 | Renggli |
| 7,546,738 B2 | 6/2009 | Peters |
| 7,793,504 B2 | 9/2010 | Baker et al. |
| 7,874,160 B2 | 1/2011 | Swanson et al. |
| 7,975,488 B2 | 7/2011 | Farah et al. |
| 2007/0186535 A1 | 8/2007 | Powell et al. |
| 2008/0141655 A1 | 6/2008 | Johnson et al. |
| 2012/0255806 A1 | 10/2012 | Pilon |

\* cited by examiner

NOZZLE FOR JET ENGINES

CROSS REFERENCE TO RELATED APPLICATIONS

This application claims priority to and the benefit of U.S. Provisional Patent Application No. 62/155,242, filed 30 Apr. 2015, the disclosure of which is now expressly incorporated herein by reference.

FIELD OF THE DISCLOSURE

The present disclosure relates generally to gas turbine engines, and more specifically to exhaust systems for gas turbine engines.

BACKGROUND

Gas turbine engines used in some aircraft include exhaust systems that have variable area exhaust nozzles. Variable area exhaust nozzles may include flaps that are movable to vary the area of the exhaust nozzles. Those exhaust nozzles, however, may present a number of drawbacks when confronted with the space constraints of some gas turbine engines. Alternative variable area exhaust nozzles for gas turbine engines therefore remain an area of interest.

SUMMARY

The present disclosure may comprise one or more of the following features and combinations thereof.

According to one aspect of the present disclosure, a gas turbine engine may comprise an engine core, a fan coupled to the engine core to be driven by the engine core, and an exhaust system coupled to the engine core. The engine core may be configured to discharge a first stream of pressurized core air that is passed through the engine core. The fan may be configured to discharge a second stream of pressurized bypass air and a third stream of pressurized bypass air that are passed around the engine core. The exhaust system may include a primary-stream nozzle arranged to adjust the first stream of pressurized core air discharged from the engine core and the second stream of pressurized bypass air discharged from the fan. The exhaust system may also include a third-stream nozzle arranged to adjust the third stream of pressurized bypass air discharged by the fan. The third stream of pressurized bypass air may be adjustable via the third-stream nozzle based on adjustment of the first stream of pressurized core air and the second stream of pressurized bypass air by the primary-stream nozzle.

In some embodiments, the third-stream nozzle may include a third-stream duct wall and a plurality of third-stream adjustment flaps mounted to move relative to the third-stream duct wall between (i) a constricted position in which the third-stream adjustment flaps substantially close down a third-stream-nozzle throat defined between the third-stream adjustment flaps and a plurality of primary-stream adjustment flaps of the primary-stream nozzle to restrict the third stream of pressurized bypass air from passing through the third-stream nozzle and (ii) an unconstricted position in which the third-stream adjustment flaps open the third-stream-nozzle throat to allow the third stream of pressurized bypass air to pass more freely through the third-stream nozzle. The third-stream nozzle may include third-stream-nozzle actuators coupled to the third-stream adjustment flaps and configured to pivot the third-stream adjustment flaps between the constricted position and the unconstricted position.

In some embodiments, the primary-stream nozzle may include at least one primary-stream duct wall, a plurality of forward primary-stream adjustment flaps mounted to pivot relative to the at least one primary-stream duct wall to adjust a primary-nozzle-throat defined between the plurality of forward primary-stream adjustment flaps, and a plurality of aft primary-stream adjustment flaps mounted to move relative to the plurality of forward primary-stream adjustment flaps to adjust an outlet area of the primary-stream nozzle defined between the plurality of aft primary-stream adjustment flaps. The primary-stream nozzle may include one primary-stream-nozzle actuator coupled to at least one of the forward primary-stream adjustment flaps and configured to pivot the at least one of the forward primary-stream adjustment flaps relative to the primary-stream duct wall. The primary-stream nozzle may include another primary-stream-nozzle actuator coupled to at least one of the aft primary-stream adjustment flaps and configured to move the at least one of the aft primary-stream adjustment flaps relative to the at least one of the forward primary-stream adjustment flaps. Additionally, in some embodiments, each of the forward primary-stream adjustment flaps may have a leading edge spaced forward of a trailing edge along a central axis of the gas turbine engine, and the primary-nozzle-throat may be defined between the trailing edges of the forward primary-stream adjustment flaps. Each of the aft primary-stream adjustment flaps may have a trailing edge spaced aft of a leading edge along the central axis, and the outlet area may be defined between the trailing edges of the aft primary-stream adjustment flaps.

In some embodiments, each of the forward primary-stream adjustment flaps may extend aft of the primary-stream duct wall toward a central axis of the gas turbine engine. Each of the aft primary-stream adjustment flaps may extend aft of one of the forward primary-stream adjustment flaps away from the central axis.

According to another aspect of the present disclosure, a gas turbine engine may comprise an engine core, a fan coupled to the engine core to be driven by the engine core, and an exhaust system coupled to the engine core. The engine core may be configured to discharge a first stream of pressurized core air that is passed through the engine core. The fan may be configured to discharge a second stream of pressurized bypass air and a third stream of pressurized bypass air that are passed around the engine core. The exhaust system may include a primary-stream nozzle arranged to adjust the first stream of pressurized core air discharged from the engine core and the second stream of pressurized bypass air. The exhaust system may also include a third-stream nozzle arranged to adjust the third stream of pressurized bypass air. The primary-stream nozzle may include a primary-stream duct wall, a plurality of forward primary-stream adjustment flaps mounted to pivot relative to the primary-stream duct wall to adjust a primary-nozzle-throat defined between the plurality of forward primary-stream adjustment flaps, and a plurality of aft primary-stream adjustment flaps mounted to pivot relative to the plurality of forward primary-stream adjustment flaps to adjust a primary-stream-nozzle outlet area defined between the plurality of aft primary-stream adjustment flaps.

In some embodiments, the third-stream nozzle may include a third-stream duct wall and a plurality of third-stream adjustment flaps mounted to move relative to the third-stream duct wall between (i) a constricted position in which the third-stream adjustment flaps substantially close down a third-stream-nozzle throat defined between the third-stream adjustment flaps and the aft primary-stream adjustment flaps and (ii) an unconstricted position in which the third-stream adjustment flaps open the third-stream-nozzle throat. The third-stream nozzle may include a third-stream-nozzle actuator coupled to the third-stream adjustment flaps and configured to pivot the third-stream adjustment flaps between the constricted position and the unconstricted position.

In some embodiments, the primary-stream nozzle may include one primary-stream-nozzle actuator coupled to at least one of the forward primary-stream adjustment flaps and configured to pivot the at least one of the forward primary-stream adjustment flaps relative to the primary-stream duct wall. The primary-stream nozzle may include another primary-stream-nozzle actuator coupled to at least one of the aft primary-stream adjustment flaps and configured to move the at least one of the aft primary-stream adjustment flaps relative to the at least one of the forward primary-stream adjustment flaps. Additionally, in some embodiments, the third-stream nozzle may include a third-stream duct wall and a plurality of third-stream adjustment flaps mounted to pivot relative to the third-stream duct wall to adjust a third-stream-nozzle throat defined between the plurality of third-stream adjustment flaps and the aft primary-stream adjustment flaps, and the third-stream-nozzle throat may be adjustable based on adjustment of the primary-stream-nozzle throat.

According to yet another aspect of the present disclosure, an exhaust system for a gas turbine engine may comprise an internal, primary-stream nozzle and an external, third-stream nozzle. The internal, primary-stream nozzle may be arranged to adjust at least one of a primary stream of pressurized core air that is passed through and discharged from an engine core of the gas turbine engine and a second stream of pressurized bypass air that is discharged from a fan of the gas turbine engine and passed around the engine core. The external, third-stream nozzle may be arranged to adjust a third stream of pressurized bypass air that is discharged from the fan and passed around the engine core. The third stream of pressurized bypass air may be adjustable via the third-stream nozzle based on adjustment of the at least one of the primary stream of pressurized core air and the second stream of pressurized bypass air via the primary-stream nozzle.

In some embodiments, the third-stream nozzle may include a third-stream duct wall and a plurality of third-stream adjustment flaps mounted to move relative to the third-stream duct wall between (i) a constricted position in which the third-stream adjustment flaps substantially close down a third-stream-nozzle throat defined between the third-stream adjustment flaps and a plurality of primary-stream adjustment flaps of the primary-stream nozzle to restrict the third stream of pressurized bypass air from passing through the third-stream nozzle and (ii) an unconstricted position in which the third-stream adjustment flaps open the third-stream-nozzle throat to allow the third stream of pressurized bypass air to pass more freely through the third-stream nozzle. The primary-stream nozzle may include a primary-stream duct wall, a plurality of forward primary-stream adjustment flaps mounted to pivot relative to the primary-stream duct wall to adjust a primary-nozzle-throat defined between the plurality of forward primary-stream adjustment flaps, and a plurality of aft primary-stream adjustment flaps mounted to move relative to the plurality of forward primary-stream adjustment flaps to adjust an outlet area of the primary-stream nozzle defined between the plurality of aft primary-stream adjustment flaps. Each of the forward primary-stream adjustment flaps may extend aft of the primary-stream duct wall toward a central axis of the exhaust system, and each of the aft primary-stream adjustment flaps may extend aft of one of the forward primary-stream adjustment flaps away from the central axis.

These and other features of the present disclosure will become more apparent from the following description of the illustrative embodiments.

DETAILED DESCRIPTION OF THE DRAWINGS

Figure 1A:
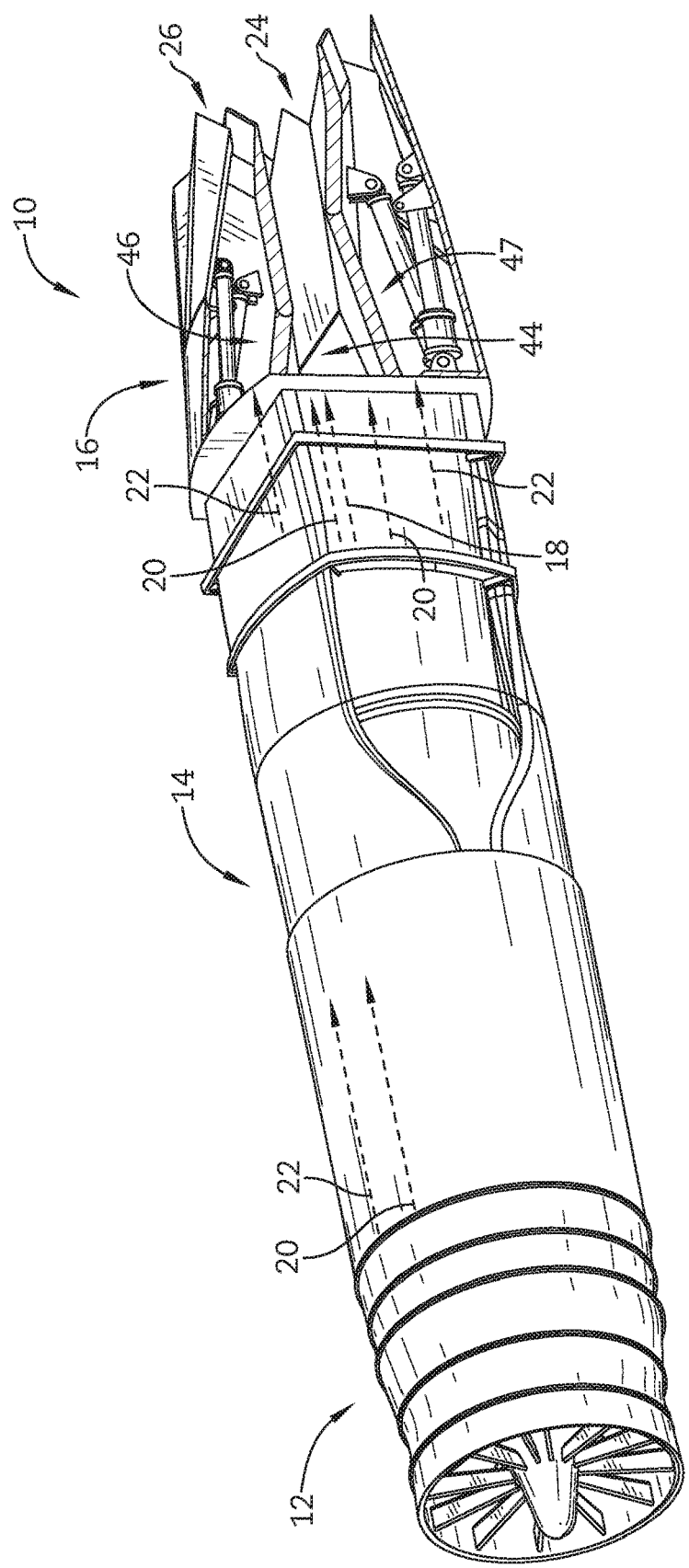
FIG. 1A is a perspective view of a gas turbine engine that includes an engine core, a fan coupled to the engine core, and an exhaust system coupled to the engine core and adapted to adjust various flow streams as they exit the engine.

For the purposes of promoting an understanding of the principles of the disclosure, reference will now be made to a number of illustrative embodiments illustrated in the drawings and specific language will be used to describe the same.

Figure 1B:
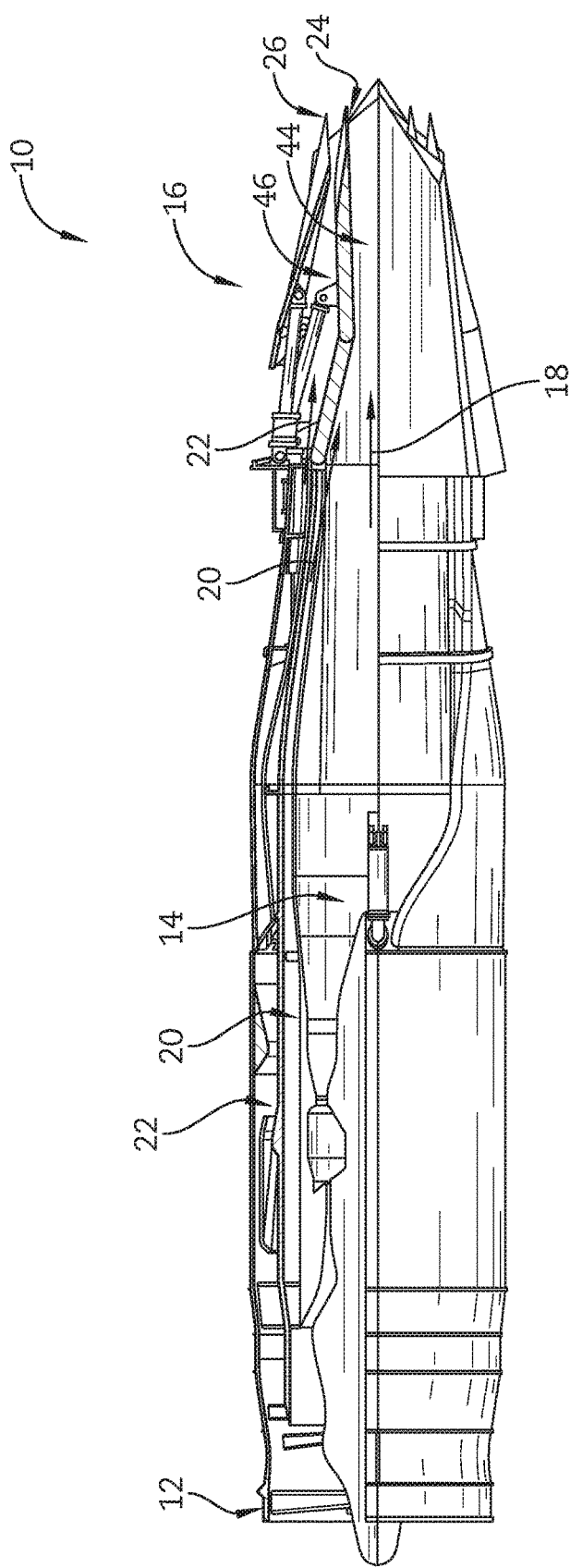
FIG. 1B is a cross-sectional view of the gas turbine engine of FIG. 1A showing the flow streams passing toward and into the exhaust system.

Referring now to FIGS. 1A and 1B, an illustrative gas turbine engine 10 includes a fan 12, an engine core 14, and an exhaust system (or nozzle) 16. The engine core 14 is configured to discharge a first stream of pressurized core air 18 that is passed through the engine core 14. The fan 12 is coupled to the engine core 14 to be driven by the engine core 14, and the fan 12 is configured to discharge a second stream of pressurized bypass air 20 and a third stream of pressurized bypass air 22 that are passed around the engine core 14. The exhaust system 16 is coupled to the engine core 14, and the exhaust system 16 includes an internal, primary nozzle 24 and an external, third-stream nozzle 26. The primary nozzle 24 is arranged to adjust the first stream of pressurized core air 18 and the second stream of pressurized bypass air 20. The third-stream nozzle 26 cooperates with the primary nozzle 24 to adjust the third stream of pressurized bypass air 22.

The exhaust system 16 illustratively includes a primary passageway 44 and third-stream passageways 46, 47, in addition to the primary and third-stream nozzles 24, 26, as shown in FIGS. 1A and 1B. The first stream of pressurized core air 18 and the second stream of pressurized bypass air 20 are conducted together through the primary nozzle 24 via the primary passageway 44. The third stream of pressurized bypass air 22 is conducted through the third-stream nozzle 26 via the third-stream passageways 46, 47. The primary nozzle 24 adjusts the flow of the streams 18, 20 through the exhaust system 16, and the third-stream nozzle 26 adjusts the flow of the stream 22 through the exhaust system 16. By controlling the flow of pressurized air through and around the engine core 14, the air-stream nozzles 24, 26 adjust (or trim) the operating point of the gas turbine engine 10.

Figure 2:
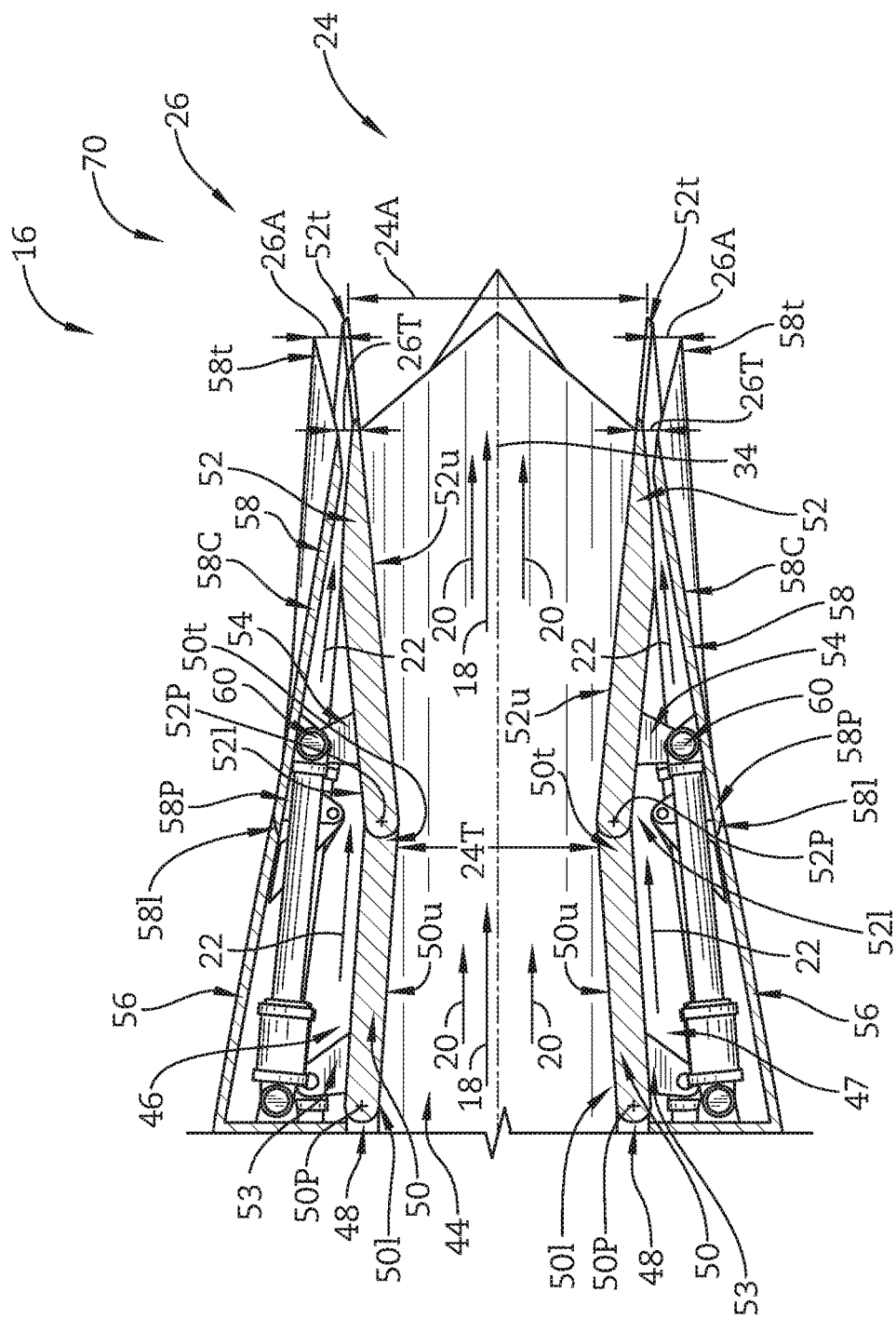
FIG. 2 is a cross-sectional view of the exhaust system of FIG. 1A showing an internal, primary nozzle and an external, third-stream nozzle included in the exhaust system at one operating point of the gas turbine engine.

Referring now to FIG. 2, the primary nozzle 24 includes static primary-stream duct walls 48, forward primary-stream adjustment flaps 50, aft primary-stream adjustment flaps 52, and primary-stream-nozzle actuators 53, 54. The primary-stream duct wall 48 and the forward and aft primary-stream adjustment flaps 50, 52 cooperate to define the primary passageway 44. The forward primary-stream adjustment flaps 50 are mounted to pivot relative to the static primary-stream duct walls 48, and the aft primary-stream adjustment flaps 52 are mounted to move relative to the forward primary-stream adjustment flaps 50. One primary-stream-nozzle actuator 53 is coupled to each of the forward primary-stream adjustment flaps 50 to pivot each of the flaps 50 relative to the primary-stream duct wall 48. One primary-stream-nozzle actuator 54 is coupled to each of the aft primary-stream adjustment flaps 52 to move each of the aft primary-stream adjustment flaps 52 relative to one of the forward primary-stream adjustment flaps 50.

The forward primary-stream adjustment flaps 50 each have a leading edge 50*l* and a trailing edge 50*t* spaced aft of the leading edge 50*l* as shown in FIG. 2. The leading edge 50*l* of each flap 50 is mounted to pivot relative to the primary-stream duct wall 48. Each flap 50 is mounted to pivot relative to the primary-stream duct wall 48 about a pivot axis 50*p* located adjacent the leading edge 50*l* of each flap 50. The forward primary-stream adjustment flaps 50 each extend aft of the primary-stream duct wall 48 from the leading edge 50*l* to the trailing edge 50*t* toward a central axis 34 as shown in FIG. 2. The flaps 50 may therefore be said to be convergent flaps.

In the illustrative embodiment, the forward primary-stream adjustment flaps 50 include two convergent flaps that cooperate to define a primary-nozzle-throat 24T between the trailing edges 50*t* of the two flaps 50. In other embodiments, however, any suitable number of convergent flaps (e.g., more or less than two) may be included in the primary nozzle 24.

The primary-stream-nozzle actuators 53 are coupled to the primary-stream duct wall 48 and the forward primary-stream adjustment flaps 50 as shown in FIG. 2. The primary-stream-nozzle actuators 53 are configured to pivot the forward primary-stream adjustment flaps 50 relative to the primary-stream duct wall 48 about the pivot axes 50*p* to adjust the primary-nozzle-throat 24T. Adjustment of the throat 24T via the actuators 53 adjusts the passageway 44 and the streams 18, 20 that pass through the passageway 44. Additionally, because the passageway 46 is partially defined by the flaps 50 as discussed below, adjustment of the throat 24T adjusts the passageway 46 and the stream 22 that passes through the passageway 46. In this first respect, the stream 22 is adjustable via the third-stream nozzle 26 based on adjustment of the streams 18, 20 via the primary nozzle 24.

In one example, the actuators 53 may be embodied as, or otherwise include, hydraulically-operated actuators such as hydraulic pistons. In another example, the actuators 53 may be embodied as, or otherwise include, electrically-powered actuators such as electrically-powered linear actuators.

The aft primary-stream adjustment flaps 52 each have a leading edge 52*l* and a trailing edge 52*t* spaced aft of the leading edge 52*l* as shown in FIG. 2. The leading edge 52*l* of each flap 52 is mounted to pivot relative to the trailing edge 50*t* of one of the flaps 50. Each flap 52 is mounted to pivot relative to one of the flaps 50 about a pivot axis 52*p* located adjacent the leading edge 52*l* of each flap 52. The aft primary-stream adjustment flaps 52 each extend aft of one of the forward primary-stream adjustment flaps 50 from the leading edge 52*l* to the trailing edge 52*t* away from the central axis 34 as shown in FIG. 2. The flaps 52 may therefore be said to be divergent flaps.

In the illustrative embodiment, the aft primary-stream adjustment flaps 52 include two divergent flaps that cooperate to define a primary-stream-nozzle outlet area 24A between the trailing edges 52*t* of the two flaps 52. In other embodiments, however, any suitable number of divergent flaps (e.g., more or less than two) may be included in the primary nozzle 24.

The primary-stream-nozzle actuators 54 are coupled to the primary-stream duct wall 48 and the aft primary-stream adjustment flaps 52 as shown in FIG. 2. The primary-stream-nozzle actuators 54 are configured to pivot the aft primary-stream adjustment flaps 52 relative to the forward primary-stream adjustment flaps 50 about the pivot axes 52*p* to adjust the primary-stream-nozzle outlet area 24A. Adjustment of the outlet area 24A via the actuators 54 adjusts the streams 18, 20 that pass through the primary nozzle 24. Additionally, because the passageway 46 is partially defined by the flaps 52 as discussed below, adjustment of the outlet area 24A adjusts the passageway 46 and the stream 22 that passes through the passageway 46. In this second respect, the stream 22 is adjustable via the third-stream nozzle 26 based on adjustment of the streams 18, 20 via the primary nozzle 24.

In one example, the actuators 54 may be embodied as, or otherwise include, hydraulically-operated actuators such as hydraulic pistons. In another example, the actuators 54 may be embodied as, or otherwise include, electrically-powered actuators such as electrically-powered linear actuators.

The third-stream nozzle 26 illustratively includes static third-stream duct walls 56, third-stream adjustment flaps 58, and third-stream-nozzle actuators 60 as shown in FIG. 2. The third-stream duct walls 56, the third-stream adjustment flaps 58, and the forward and aft primary-stream adjustment flaps 50, 52 cooperate to define the third-stream passageways 46, 47 outboard of the primary-stream passageway 44. The third-stream adjustment flaps 58 are mounted to move relative to the third-stream duct wall 56. One third-stream-nozzle actuator 60 is coupled to each of the third-stream adjustment flaps 58 to pivot each of the third-stream adjustment flaps 58 relative to the third-stream duct walls 56.

The third-stream adjustment flaps 58 each have a leading edge 58*l* and a trailing edge 58*t* spaced aft of the leading edge 58*l* as shown in FIG. 2. The leading edge 58*l* of each flap 58 is mounted to pivot relative to the third-stream duct wall 56. Each flap 58 is mounted to pivot relative to the third-stream duct wall 56 about a pivot axis 58*p* located adjacent the leading edge 58*l* of each flap 58.

The third-stream adjustment flaps 58 are positioned about the central axis 34 outside of the forward and aft primary-stream adjustment flaps 50, 52 as shown in FIG. 2. The flaps 58 at least partially define an exterior of the exhaust system 16 as shown in FIG. 1A. The flaps 58 may therefore be said to be external flaps.

In the illustrative embodiment, the third-stream adjustment flaps 58 include two external flaps. In other embodiments, however, any suitable number of external flaps (e.g., more or less than two) may be included in the third-stream nozzle 26. For example, in a three-dimensional nozzle arrangement, more than two flaps may be used to provide the third-stream nozzle 26.

In the illustrative embodiment, the two external flaps 58 cooperate with the two aft primary-stream adjustment flaps 52 to define both a third-stream-nozzle throat 26T and a third-stream-nozzle outlet area 26A between the trailing edges 58t of the flaps 58 and the trailing edges 52t of the flaps 52. The third-stream-nozzle throat 26T is illustratively defined forward of the third-stream-nozzle outlet area 26A as shown in FIG. 2.

The third-stream-nozzle actuators 60 are coupled to the third-stream duct wall 56 and the third-stream adjustment flaps 58 as shown in FIG. 2. The third-stream-nozzle actuators 60 are configured to pivot the third-stream adjustment flaps 58 relative to the third-stream duct wall 56 about the pivot axes 58p to adjust the third-stream-nozzle throat 26T.

Unlike the third-stream-nozzle throat 26T, the primary-stream-nozzle throat 24T, and the primary-stream-nozzle outlet area 24A, the third-stream-nozzle outlet area 26A is not directly adjusted via actuators as suggested by FIG. 2. Rather, the outlet area 26A is set based on adjustment of the throat 26T via the actuators 60, adjustment of the throat 24T via the actuators 53, and adjustment of the outlet area 24A via the actuators 54. The outlet area 26A may therefore be said to be a fallout of the geometry of the throat 26T, the throat 24T, and the outlet area 24A.

Referring still to FIG. 2, the exhaust system 16 will now be described with reference to the operation of the engine 10. At an operating point 70 of the engine 10, the adjustment flaps 50, 52 of the primary nozzle 24 are in unconstricted positions 50U, 52U, respectively. Additionally, at the operating point 70, the adjustment flaps 58 of the third-stream nozzle 26 are in a constricted position 58C.

In the unconstricted position 50U of the forward primary-stream adjustment flaps 50, the primary-stream-nozzle throat 24T is open to allow the streams 18, 20 to pass relatively freely through the passageway 44 as shown in FIG. 2. In the unconstricted position 52U of the aft primary-stream adjustment flaps 52, the primary-stream-nozzle outlet area 24A is open to allow the streams 18, 20 to pass relatively freely through and exit the primary nozzle 24.

In the constricted position 58C of the third-stream adjustment flaps 58, the third-stream-nozzle throat 26T is closed down to restrict the stream 22 from passing through the passageway 46 as shown in FIG. 2. Additionally, in the constricted position 58C of the flaps 58, the third-stream-nozzle outlet area 26A restricts the stream 22 from passing through and exiting the third-stream nozzle 26.

In the illustrative embodiment, the operating point 70 represents a supersonic cruise operating point of the engine 10. During the supersonic cruise operating point 70, the exhaust system 16 allows the stream 18 to pass relatively freely through the engine core 14 to provide increased thrust while restricting the stream 22 from passing around the engine core 14. In other embodiments, however, the operating point 70 may represent a different operating point of the engine 10.

Figure 3:
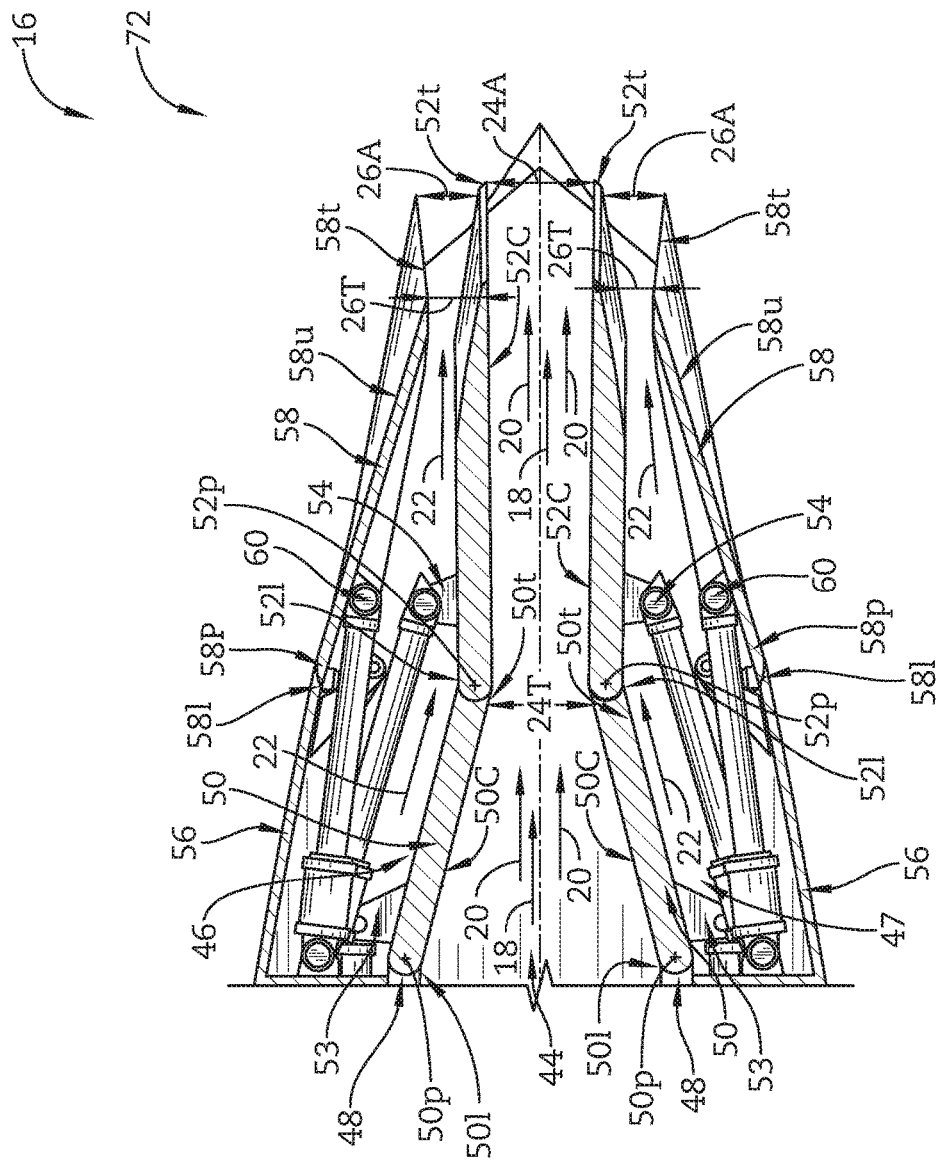
FIG. 3 is a cross-sectional view similar to FIG. 2 showing the internal, primary nozzle and the external, third-stream nozzle of the exhaust system at another operating point of the gas turbine engine.

Referring now to FIG. 3, the exhaust system 16 will again be described with reference to the operation of the engine 10. At an operating point 72 of the engine 10, the adjustment flaps 50, 52 of the primary nozzle 24 are in constricted positions 50C, 52C, respectively. Additionally, at the operating point 72, the adjustment flaps 58 of the third-stream nozzle 26 are in an unconstricted position 58U.

In the constricted position 50C of the forward primary-stream adjustment flaps 50, compared to the unconstricted position 50U, the primary-stream-nozzle throat 24T is closed down to restrict the streams 18, 20 from passing through the passageway 44 as shown in FIG. 3. In the constricted position 52C of the aft primary-stream adjustment flaps 52, compared to the unconstricted position 52U, the primary-stream-nozzle outlet area 24A is closed down to restrict the streams 18, 20 from passing through and exiting the primary nozzle 24.

In the unconstricted position 58U of the third-stream adjustment flaps 58, compared to the constricted position 58C, the third-stream-nozzle throat 26T is open to allow the stream 22 to pass relatively freely through the passageway 46 as shown in FIG. 3. Additionally, in the unconstricted position 58U of the flaps 58, compared to the constricted position 58C, the third-stream-nozzle outlet area 26A allows the stream 22 to pass relatively freely through and exit the third-stream nozzle 26.

In the illustrative embodiment, the operating point 72 represents a subsonic cruise operating point of the engine 10. During the subsonic cruise operating point 72, the exhaust system 16 restricts the stream 18 from passing through the engine core 14 to provide increased fuel efficiency while allowing the stream 22 to pass around the engine core 14 relatively freely. In other embodiments, however, the operating point 72 may represent a different operating point of the engine 10.

Referring now to FIGS. 2-3, one method of operating the exhaust system 16 will now be described. The method begins by operating the exhaust system 16 so that the forward and aft primary-stream adjustment flaps 50, 52 are in the unconstricted positions 50U, 52U and the third-stream adjustment flaps 58 are in the constricted position 58C. The method proceeds by moving the flaps 50 relative to the primary-stream duct wall 48 via the primary-stream-nozzle actuators 53 to the constricted position 50C to adjust the stream 22 that passes through the third-stream nozzle 26. The method further proceeds by moving the flaps 52 relative to the flaps 50 via the primary-stream-nozzle actuators 54 to the constricted position 52C to further adjust the stream 22 that passes through the nozzle 26. Once the flaps 52 have been moved to a fixed position, the method concludes by moving the flaps 58 relative to the third-stream duct wall 56 via the third-stream-nozzle actuators 60 to the unconstricted position 58U.

Referring again to FIGS. 2-3, another method of operating the exhaust system 16 will now be described. The method begins by operating the exhaust system 16 so that the forward and aft-stream adjustment flaps 50, 52 are in the constricted positions 50C, 52C and the third-stream adjustment flaps 58 are in the unconstricted position 58U. The method proceeds by moving the flaps 50 relative to the primary-stream duct wall 48 via the primary-stream-nozzle actuators 53 to the unconstricted position 50U to adjust the stream 22 that passes through the third-stream nozzle 26. The method further proceeds by moving the flaps 52 relative to the flaps 50 via the primary-stream-nozzle actuators 54 to the unconstricted position 52U to further adjust the stream 22 that passes through the nozzle 26. Once the flaps 52 have been moved to a fixed position, the method concludes by moving the flaps 58 relative to the third-stream duct wall 56 via the third-stream-nozzle actuators 60 to the constricted position 58C.

The components included in the exhaust system 16 shown in FIGS. 1-3 and described herein, and the arrangement of those components, may be modified and still fall within the scope of the present disclosure. For example, each of the forward primary-stream adjustment flaps 50, the aft primary-stream adjustment flaps 52, and the third-stream adjustment flaps 58 positioned below the central axis 34 be replaced with static components. Particularly, in place of the flaps 50, 52 positioned below the axis 34, a stationary ramp may be coupled to the primary-stream duct wall 48 below the axis 34 and arranged to extend horizontally below the axis 34 from the point labeled in FIGS. 2-3 as 50*l* to the point labeled in FIGS. 2-3 as 52*t*. In place of the flaps 58 positioned below the axis 34, the third-stream duct wall 56 may be arranged to extend horizontally below the axis 34 to the point labeled in FIGS. 2-3 as 58*t*. As such, each of the primary-stream-nozzle actuators 53, 54 and the third-stream-nozzle actuators 60 positioned below the axis 34 may also be omitted. In such an embodiment, components of the exhaust system positioned above the central axis 34 may remain adjustable to provide dynamic control of flow streams passing through the exhaust system 16.

This disclosure relates to variable area exhaust nozzles for thrust generating jet engines, especially those requiring high performance at several flight conditions. These nozzles are common in fighter aircrafts, particularly those that employ afterburning schemes.

These exhaust systems may require significantly different nozzle throat areas for different mission requirements. For augmented operation (afterburners), a large nozzle throat area may be desired. For cruise operations, a reduced throat area may be desired.

One objective of this disclosure is to provide a high performance variable area nozzle, sometimes called an exhaust system, 16 for thrust producing jet engines. The disclosure provides means to adjust a combination of flow streams from the engine to accommodate different flight operating conditions.

The nozzle 16 of the present disclosure is designed to adjust two general flow streams. These streams may be the primary stream (i.e., a stream of combined core air 18 and bypass air 20) and a third stream (designated third as the core air of the primary stream is a first stream 18, the bypass air of the primary stream is a second stream 20, and the third stream is bypass air 22 having a lower pressure than the second stream of bypass air 20). The nozzle 16 may use flap and seal technology to vary the primary stream throat, the third stream throat, and the primary exit area. The third stream exit area may be a fallout of the geometry and a function of the primary stream throat, the third stream throat, and the primary exit area. The third stream exit area may be set ideal for a single position and for all other positions, the third stream exit area may be a fallout.

The uniqueness of the shaped flaps may provide desired performance by varying the core and third stream throat areas and to expand the core throughout the flight envelope while expanding the third stream at a predetermined flight point. All combined streams may exit through a variable exit area of a circular, rectangular, or elliptical shape. The final shape of the nozzle may depend on the architecture of the vehicle in which the nozzle is integrated.

Separate variable primary and third stream flow passages may be used to accommodate the variable cycle features. The configuration may include upper and lower convergent and divergent hinged flaps and fixed sidewalls. The convergent flaps may be hinged to ground at the leading edge, while the divergent flaps may be hinged to the trailing edges of the convergent flaps. The primary flow circuit may be formed by the inboard flowpath surface of these flap pairs and the sidewalls. The third stream flow circuit may be plumbed via a shaped duct transitioning from a full annulus upstream of the turbine exhaust plane and supplied to chambers bounded by the outboard surface of the convergent flaps, divergent flaps, and the inboard portion of the external flap.

The primary stream throat may be formed by the minimum distance between the convergent/divergent hinge axes. The two-dimensional geometric area may then be equal to the span between the sidewalls times the vertical dimension between the converging/diverging flaps at the hinge plane. This area may be achieved by pivoting convergent flaps about the leading edge convergent/static structure hinge axis with a set of actuators. This area may set the back pressure and therefore the primary flow for optimal performance.

The primary exit area may be the aft projected area at the exit of the divergent flaps. This degree of freedom may be achieved by pivoting the divergent flaps about the convergent/divergent hinge axis with a set of actuators grounded to a static structure. This exit area may be variable as the ideal exit area for an ideal expanded nozzle changes as a function of Nozzle Pressure Ratio (NPR). The NPR of the primary stream may dictate the ideal exit area, i.e. the ideal ratio of the primary exit area to the primary stream throat area, such that the exit static pressure matches ambient static pressure. This may optimize overall internal performance by "perfectly expanding" the internal flow.

The third stream throat may be the controlling area for the third stream flow. The third stream throat may form at the pinch point between outboard trailing edge surface of the divergent flap and the inboard trailing edge surface of the convergent flap. With the divergent flaps set to a fixed position, this degree of freedom may be achieved by pivoting the external flaps with a set of grounded actuators about the external/static structure hinge axis. This area may set the back pressure and therefore the flow across the fan entering the third stream duct.

The third stream exit area may not be directly controlled and may be set by geometric features chosen in the design process. When the third stream is choked, i.e., the pressure ratio of the third stream is greater than 1.9, an additional thrust improvement from this flow may be realized by shaping the underside of the external flap such that the third stream exit area is ideal for the NPR of the third stream. This may only be set ideal for one condition/position. This ideal position may only be determined by a detailed mission analysis. The ideal position may be a subsonic cruise position, where a significant flow exits through the third stream, or a supersonic cruise position where the NPR of the third stream is significant and peak performance is required to overcome supersonic drag.

The exhaust system of this disclosure may optimize performance across the flight envelope and at a single flight point via the single ideal expansion position of the third stream exit area. The outboard surfaces of the convergent and divergent flaps may be contoured to produce a smooth aerodynamic surface that minimizes third stream pressure loss.

This disclosure may use the third stream as a supersonic ejector at conditions where the nozzle may be over-expanded to minimize nozzle losses. This may alleviate the trade between cruise and after burning performance that would otherwise be expected for a fixed area nozzle. This disclosure may also provide dual use of the flap and seal technology. The flaps may be used to control the throat area of the nozzle, and may also be used to induce a thrust vector. The exhaust system of this disclosure may be flexible in that it can be configured in multiple installations from round with many flap trains to two-dimensional.

The nozzle design may have several different architectures based on the actuation and quantity of the variable area flap system. This may be a trade between complexity and weight.

FIG. 2 shows a concept in which 6 flaps (2 convergent, 2 divergent, 2 external) may be arranged in a two-dimensional symmetrical manner and may be in a supersonic cruise position where all areas (the primary throat area, the primary exit area, the third stream throat area, the third stream exit area) may be set ideal for the cycle. FIG. 3 shows a concept in which 6 flaps (2 convergent, 2 divergent, 2 external) may be arranged in a two-dimensional symmetrical manner and may be in a subsonic cruise position where the primary throat area, the primary exit area, and the third stream throat area are set ideal for the cycle while the third stream exit area may be a fallout of the geometry and therefore not ideal for maximum performance.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
an engine core configured to discharge a first stream of pressurized core air that is passed through the engine core,
a fan coupled to the engine core to be driven by the engine core, the fan configured to discharge a second stream of pressurized bypass air and a third stream of pressurized bypass air that are passed around the engine core, and
an exhaust system coupled to the engine core, the exhaust system including a primary-stream nozzle arranged to adjust the first stream of pressurized core air discharged from the engine core and the second stream of pressurized bypass air discharged from the fan and including a third-stream nozzle arranged to adjust the third stream of pressurized bypass air discharged by the fan,
wherein the third stream of pressurized bypass air is adjustable via the third-stream nozzle based on adjustment of the first stream of pressurized core air and the second stream of pressurized bypass air by the primary-stream nozzle,
wherein the primary-stream nozzle includes at least one primary-stream duct wall, a plurality of forward primary-stream adjustment flaps mounted to pivot relative to the at least one primary-stream duct wall to adjust a primary-nozzle-throat defined between the plurality of forward primary-stream adjustment flaps, a plurality of aft primary-stream adjustment flaps mounted to move relative to the plurality of forward primary-stream adjustment flaps to adjust an outlet area of the primary-stream nozzle defined between the plurality of aft primary-stream adjustment flaps, one primary-stream-nozzle actuator coupled to at least one of the forward primary-stream adjustment flaps and configured to pivot the at least one of the forward primary-stream adjustment flaps relative to the primary-stream duct wall, and another primary-stream-nozzle actuator coupled to at least one of the aft primary-stream adjustment flaps and configured to move the at least one of the aft primary-stream adjustment flaps relative to the at least one of the forward primary-stream adjustment flaps.

2. The gas turbine engine of claim 1, wherein the third-stream nozzle includes a third-stream duct wall and a plurality of third-stream adjustment flaps mounted to move relative to the third-stream duct wall between (i) a constricted position in which the third-stream adjustment flaps substantially close down a third-stream-nozzle throat defined between the third-stream adjustment flaps and a plurality of primary-stream adjustment flaps of the primary-stream nozzle to restrict the third stream of pressurized bypass air from passing through the third-stream nozzle and (ii) an unconstricted position in which the third-stream adjustment flaps open the third-stream-nozzle throat to allow the third stream of pressurized bypass air to pass more freely through the third-stream nozzle.

3. The gas turbine engine of claim 2, wherein the third-stream nozzle includes third-stream-nozzle actuators coupled to the third-stream adjustment flaps and configured to pivot the third-stream adjustment flaps between the constricted position and the unconstricted position.

4. The gas turbine engine of claim 1, wherein (i) each of the forward primary-stream adjustment flaps has a leading edge spaced forward of a trailing edge along a central axis of the gas turbine engine, and (ii) the primary-nozzle-throat is defined between the trailing edges of the forward primary-stream adjustment flaps.

5. The gas turbine engine of claim 4, wherein (i) each of the aft primary-stream adjustment flaps has a trailing edge spaced aft of a leading edge along the central axis, and (ii) the outlet area is defined between the trailing edges of the aft primary-stream adjustment flaps.

6. The gas turbine engine of claim 1, wherein each of the forward primary-stream adjustment flaps extends aft of the primary-stream duct wall toward a central axis of the gas turbine engine.

7. The gas turbine engine of claim 6, wherein each of the aft primary-stream adjustment flaps extends aft of one of the forward primary-stream adjustment flaps away from the central axis.

8. A gas turbine engine comprising:
an engine core configured to discharge a first stream of pressurized core air that is passed through the engine core,
a fan coupled to the engine core to be driven by the engine core, the fan configured to discharge a second stream of pressurized bypass air and a third stream of pressurized bypass air that are passed around the engine core, and
an exhaust system coupled to the engine core, the exhaust system including a primary-stream nozzle arranged to adjust the first stream of pressurized core air discharged from the engine core and the second stream of pressurized bypass air and including a third-stream nozzle arranged to adjust the third stream of pressurized bypass air,
wherein the primary-stream nozzle includes a primary-stream duct wall, a plurality of forward primary-stream adjustment flaps mounted to pivot relative to the primary-stream duct wall to adjust a primary-nozzle-throat defined between the plurality of forward primary-stream adjustment flaps, and a plurality of aft primary-stream adjustment flaps mounted to pivot relative to the plurality of forward primary-stream adjustment flaps to adjust a primary-stream-nozzle outlet area defined between the plurality of aft primary-stream adjustment flaps,
wherein the primary-stream nozzle includes one primary-stream-nozzle actuator coupled to at least one of the forward primary-stream adjustment flaps and configured to pivot the at least one of the forward primary-stream adjustment flaps relative to the primary-stream duct wall and another primary-stream-nozzle actuator coupled to at least one of the aft primary-stream adjustment flaps and configured to move the at least one of the aft primary-stream adjustment flaps relative to the at least one of the forward primary-stream adjustment flaps.

9. The gas turbine engine of claim 8, wherein the third-stream nozzle includes a third-stream duct wall and a plurality of third-stream adjustment flaps mounted to move relative to the third-stream duct wall between (i) a constricted position in which the third-stream adjustment flaps substantially close down a third-stream-nozzle throat defined between the third-stream adjustment flaps and the aft primary-stream adjustment flaps and (ii) an unconstricted position in which the third-stream adjustment flaps open the third-stream-nozzle throat.

10. The gas turbine engine of claim 9, wherein the third-stream nozzle includes a third-stream-nozzle actuator coupled to the third-stream adjustment flaps and configured to pivot the third-stream adjustment flaps between the constricted position and the unconstricted position.

11. The gas turbine engine of claim 8, wherein (i) the third-stream nozzle includes a third-stream duct wall and a plurality of third-stream adjustment flaps mounted to pivot relative to the third-stream duct wall to adjust a third-stream-nozzle throat defined between the plurality of third-stream adjustment flaps and the aft primary-stream adjustment flaps, and (ii) the third-stream-nozzle throat is adjustable based on adjustment of the primary-stream-nozzle throat.

12. An exhaust system for a gas turbine engine, the exhaust system comprising:
a primary-stream nozzle internal to an engine core of the gas turbine engine and arranged to adjust at least one of a primary stream of pressurized core air that is passed through and discharged from the engine core and a second stream of pressurized bypass air that is discharged from a fan of the gas turbine engine and passed around the engine core, and
a third-stream nozzle external to the engine core and arranged to adjust a third stream of pressurized bypass air that is discharged from the fan and passed around the engine core,
wherein the third stream of pressurized bypass air is adjustable via the third-stream nozzle based on adjustment of the at least one of the primary stream of pressurized core air and the second stream of pressurized bypass air via the primary-stream nozzle,
wherein the primary-stream nozzle includes at least one primary-stream duct wall, a plurality of forward primary-stream adjustment flaps mounted to pivot relative to the at least one primary-stream duct wall to adjust a primary-nozzle-throat defined between the plurality of forward primary-stream adjustment flaps, a plurality of aft primary-stream adjustment flaps mounted to move relative to the plurality of forward primary-stream adjustment flaps to adjust an outlet area of the primary-stream nozzle defined between the plurality of aft primary-stream adjustment flaps, a first primary-stream-nozzle actuator coupled to at least one of the forward primary-stream adjustment flaps and configured to pivot the at least one of the forward primary-stream adjustment flaps relative to the primary-stream duct wall, and a second primary-stream-nozzle actuator coupled to at least one of the aft primary-stream adjustment flaps and configured to move the at least one of the aft primary-stream adjustment flaps relative to the at least one of the forward primary-stream adjustment flaps.

13. The exhaust system of claim 12, wherein the third-stream nozzle includes a third-stream duct wall and a plurality of third-stream adjustment flaps mounted to move relative to the third-stream duct wall between (i) a constricted position in which the third-stream adjustment flaps substantially close down a third-stream-nozzle throat defined between the third-stream adjustment flaps and a plurality of primary-stream adjustment flaps of the primary-stream nozzle to restrict the third stream of pressurized bypass air from passing through the third-stream nozzle and (ii) an unconstricted position in which the third-stream adjustment flaps open the third-stream-nozzle throat to allow the third stream of pressurized bypass air to pass more freely through the third-stream nozzle.

14. The exhaust system of claim 12, wherein (i) each of the forward primary-stream adjustment flaps extends aft of the primary-stream duct wall toward a central axis of the exhaust system, and (ii) each of the aft primary-stream adjustment flaps extends aft of one of the forward primary-stream adjustment flaps away from the central axis.

* * * * *